United States Patent Office 2,813,008
Patented Nov. 12, 1957

2,813,008

METHOD OF PURIFYING SILICON TETRAFLUORIDE

Carl Marcus Olson, Newark, Del., assignor to E. I. du Pont de Nemours and Company, Wilmington, Del., a corporation of Delaware No Drawing. Application June 25, 1954, Serial No. 439,447

2 Claims. (Cl. 23—205)

This invention relates to the preparation of hyperpure silicon and to improved processes for such preparation. More particularly, it relates to novel methods for removing trace impurities from silicon halides employed as reactants in silicon preparation. Still more particularly, it relates to a novel process for removing contaminating compounds from a silicon chloride utilized as a reactant to obtain pure silicon.

As is known, silicon can be prepared by vapor phase reduction of silicon tetrachloride with zinc. However, silicon thus prepared contains traces of objectionable metal contaminants and may contain up to as much as .03% of carbon. For the most sensitive electronic uses a product of higher purity is required because even trace amounts of impurities prove detrimental for the most exacting semiconductor requirements of newer electronics applications, such as transistors.

Commercially available silicon tetrachloride is prepared by chlorinating the purest commercially available electro-furnace silicon. Because electro-furnace silicon is made by the reduction of silica in the presence of carbon or graphite, this source of metal always contains appreciable amounts of carbon and other objectionable impurities. As these impurities are readily chlorinated along with the silicon, and are difficult or impossible to separate from it by distillation or otherwise, the purest commercially available silicon tetrachloride usually retains minor or trace amounts of chloro- or oxychloro- or other complex chloro- compounds of such elements as carbon, boron, iron, copper, tin, aluminum, titanium, chromium, nickel, vanadium, phosphorus, and others, as well as oxychloro-compounds of silicon, which have boiling points very close to silicon tetrachloride. Thus, the impurity content of commercially available silicon tetrachloride is rarely low enough to obtain from it transistor-grade pure elemental silicon with the constancy required for commercial production of silicon using processes described in the literature to date. This is particularly true since most of the above-named impurities influence the semiconductor qualities of the silicon when present in the product crystals even in trace amounts.

It is among the objects of this invention to overcome these and other disadvantages attending prior silicon production and to provide an improved process for the produciton of hyperpure elemental silicon by the vapor phase reduction of pure silicon halide vapor with pure elemental reductant metal such as zinc vapor. A further object is to provide an improved process for producing hyperpure elemental silicon possessing improved electrical semiconductor qualities. Another object is to provide an improved process for purifying silicon halides. Other objects and advantages of the invention will be apparent from the ensuing description thereof.

The objects are accomplished in this invention which broadly comprises prior to reacting an impure silicon halide with a reductant metal, passing a stream of the silicon halide in vapor state through a high temperature pyrolysis reaction zone, condensing the vaporous product obtained therefrom, separating the resulting pyrosynthesized compounds, and then reacting in the vapor phase a stream of the purified silicon halide vapor with a vaporous stream of high-purity elemental reductant metal selected from the group zinc and cadmium in a reduction zone maintained at a temperature above the boiling point of the said elemental reductant and below the melting point of the silicon product, removing from said zone in vaporized state by-products and unreacted reactants, and recovering the hyperpure elemental silicon which deposits therein.

In a more specific embodiment, the invention comprises passing preheated, vaporized silicon tetrachloride to be reduced which contains minor amounts of contaminating compounds, including carbon compounds, through a pyrolysis reaction zone maintained at a temperature higher than the silicon tetrachloride reduction reaction temperature containing a bed of fused silica particles maintained at a temperature within the range of about 975–1200° C., condensing the silicon tetrachloride vapor effluent therefrom, separating the pyrosynthesized compounds formed during passage through said heated pyrolysis reaction zone by distillation, reacting the thus-purified silicon tetrachloride with elemental zinc vapor in a vapor phase reactor maintained at about 907–1100° C., removing the vaporous by-products and unreacted reactants obtained, and recovering the hyperpure elemental silicon deposited within said reactor.

In one preferred adaptation of the invention in which all-welded fused silica equipment is employed, a stream of commercially pure silicon tetrachloride is vaporized in a fused silica boiler and is then charged through a heated silica connecting conduit into a suitable pyrolyzing zone. This zone can comprise a closed, externally heated silica vessel containing a bed of fused silica rings maintained at a temperature higher than the silicon tetrachloride reduction reactor temperature and preferably at about 1000° C. The silicon tetrachloride is passed through the bed of heated silica rings at such a rate that a vapor retention time of about .5 to 60 seconds, and preferably from about 1–5 seconds, over the bed is obtained. The silicon tetrachloride thus treated is then separated from any carbon formed by cracking of carbonaceous impurities and is then cooled and condensed. The condensed silicon tetrachloride is then suitably distilled and fractionated thus removing undesired residual chloro-carbon, oxychloro-carbon and oxychloro-silicon, and the other complex compounds resulting from the pyrosynthesis of impurities originally present in the silicon tetrachloride. In consequence, the carbonaceous and other materials originally largely inseparable from the silicon tetrachloride by distillation become converted to forms of carbon-containing matter readily separable therefrom even in relatively small amounts. A stream of the resulting purified silicon tetrachloride is then reheated to about 950° C. and passed into a closed vapor phase reduction reactor also maintained at about 950° C. simultaneously with a stream of elemental zinc vapor of about 99.999% purity, previously heated to about the same temperature. The rate of feed of the two reactants is adjusted to maintain a stoichiometric excess of about 5–10 percent of silicon tetrachloride over the zinc. The two heated streams of reactants are immediately mixed within said reactor by means of external heating. Reaction by-products, including zinc chloride and unreacted reactants, are removed from the reaction space as vapor during reaction and, upon sufficient silicon being formed, zinc vapor addition is discontinued. After allowing the silicon tetrachloride vapor to pass through the reactor for about an hour while the reactor is still at reaction temperature, further $SiCl_4$ addition is stopped. The hyperpure elemental silicon deposited in the reaction vessel is removed therefrom after reactor cooling. The unreacted reactants can be recovered for reuse, if desired.

To a clearer understanding of the invention, the following specific examples are given. These are merely illustrative and not to be taken as limiting the scope of the invention.

*Example I*

Commercially pure silicon tetrachloride, purified by distillation and containing carbonaceous material and other contaminants in trace amounts, was volatilized at a rate of about 33 cubic centimeters per minute in a fused silica flash vaporizer maintained at 600–700° C. and passed continuously into a connected fused silica conduit heated to about 1000° C. The heated stream of silicon tetrachloride was then passed into an associated closed silica chamber maintained at about 1000° C. and containing fused silica rings of about 10 mm. diameter. The rate of addition was such that the retention time of a given increment of silicon tetrachloride within the pyrolyzing bed of silica particles was in the order of 2–3 seconds. Some carbon dust was deposited at the flash vaporizer, in the bed of heated silica rings, and in gas settling space associated with the bed of silica rings. The stream of silicon tetrachloride emerging from the heated bed of silica particles was then passed through fused silica cooling and condensing equipment. The condensed silicon tetrachloride was subjected to fractional distillation in a silica column, the distillate comprising highly purified silicon tetrachloride. This highly pure product was continuously revaporized at about 30 cubic centimeters per minute in a similar vaporizer, the effluent vapor stream being passed through silica tubing and heated to a temperature of about 950° C. and then into the reduction reactor. At the same time, zinc metal of about 99.999% purity was separately and continuously vaporized in fused silica equipment at a rate of about 34 grams per minute, preheating the zinc vapor to about 980° C., and passing the preheated zinc vapor in a separate stream into the reduction reactor, maintaining therein a 5 to 10 percent excess by weight of silicon tetrachloride. The reduction reactor comprised a closed fused silica tube about 8 inches in diameter and 6 feet long and was equipped with a separate recovery system for gaseous by-products and unreacted reactants at the exit end. The reduction reactor was maintained at about 950° C., the silicon tetrachloride and zinc vapor streams being mixed inside the reactor, immediately upon entrance therein. The silicon product was continuously deposited within the reactor, and the reaction by-product zinc chloride and unreacted silicon tetrachloride and zinc vapor were removed as vapor from the reactor over a 40-hour period. During this period, the reaction space became almost filled with hyperpure elemental silicon. The flow of reactants was discontinued, the zinc being stopped about an hour before the silicon tetrachloride and the reactor cooled to allow recovery of the product. A 50% yield, based on the silicon tetrachloride fed, was obtained, not including that fed in stoichiometric excess of the zinc.

*Example II*

Commercially pure silicon tetrachloride, purified by previous distillation and containing residual carbon compounds and other contaminants in trace amounts, was volatilized at about 33 cubic centimeters per minute in a fused silica flask into directly connected silica tubing, the silicon tetrachloride being heated during passage therethrough to about 1100° C. by externally applied heat. The heated silicon tetrachloride obtained was then passed directly into a fused silica chamber maintained at about 1100° C. by external heating, and containing fused silica chips wherein it was allowed about 30 seconds' retention. The vapor emerging from this pyrolyzing bed, containing pyrosynthesized contaminants, was then condensed and fractionated in an associated silica column, the distillate from which comprised hyperpure silicon tetrachloride adaptable for use particularly in respect to its freedom from carbon-containing contaminants in preparing hyperpure silicon as in Example I.

The minor or trace amounts of contaminating compounds, especially chloro-carbon, the oxychloro-carbon compounds mentioned, carbon tetrachloride, and various higher molecular weight complexes present in commercially pure silicon tetrachloride from the chlorination of electro-furnace silicon, vary in species and amounts present. Usually these compounds cannot be removed by distillation treatment. This is evident by the fact that commercially pure silicon tetrachloride purified by distillation and redistillation fails to exhibit carbon content reduction to any appreciable extent. The variability of species of chloro-carbon or oxychloro-carbon compounds present is indicated by the behavior of these contaminants under conditions of elevated temperature. Vaporizing silicon tetrachloride containing these contaminants in a closed silica vessel containing silica chips and maintained at 600–700° C. and preheating to about 900° C. in silica tubing sometimes causes carbonization of a portion of the carbon-containing contaminants, to form some carbon dust. The presence of this dust, while evidencing elimination of a portion of the carbon-containing contaminants, is extremely detrimental in that some of it carries through to the reactor to cause nucleation contamination of the product. Furthermore, some carbon-containing compounds passing to the vaporizer and preheater unchanged also pass along into the reaction zone wherein they break down to carbon or otherwise objectionably contaminate the elemental silicon product.

The pyrolyzing zone of this invention can comprise an area of heat transfer surface, such as an unpacked tube of inert, non-contaminating and refractive material, such as silica, or a pervious bed of packing or similar material enclosed in a suitable tube, chamber, or tower. Silica is particularly and outstandingly suitable as a material for such tube or packing surface. It can be readily obtained in a fairly high state of purity, and suitably fabricated and welded to form a continuous type of apparatus. Packing material such as rings, chips, or fragments of 2–16 mesh or larger is suitable for the purpose. In instances where silica is used as the pyrolyzing surface for silicon tetrachloride, some decomposition of the silica takes place, particularly at the higher temperature ranges, due to chlorination by the silicon tetrachloride. The oxygen compounds thus formed are also separated in the redistillation step along with the carbon compounds, and any carbon-silicon-containing compounds.

The contact time of the silicon halide over the heated pyrolysis zone is dependent upon the types and amounts of contaminating compounds, as well as the temperature at which the zone is maintained. Sufficient contact time is provided to allow for pyrosynthesizing reactions to take place to obtain compounds sufficiently changed in molecular weight for easy separation from the silicon tetrachloride. Usually about 1–5 seconds at the temperature indicated is sufficient time; however, from ½ a second to a minute and longer can be utilized.

The pyrolyzing zone is maintained at a temperature above 600° C.; however, best results when producing silicon are obtained at a temperature above that to which the silicon halide is to be subjected in the silicon halide reduction reactor. Preferably, for complete conversion of the contaminating compounds to species removable from silicon tetrachloride, and as indicated, temperatures within the range of 975° C. to 1200° C. are employed.

The temperature of the reduction reactor is maintained above the boiling point of the elemental zinc or cadmium reductant and below the melting point of the elemental silicon product. The entering streams of silicon halide and zinc reductant vapors are preheated to a temperature close to that at which the reduction reaction zone is maintained during operation.

The pressure at which the silicon halide vapor is maintained over the silica pyrolyzing bed is not critical. While pressures very close to atmospheric have been found to be satisfactory, higher or lower pressures can be used if desired. Likewise, the pressure maintained within the vapor phase reduction reactor and interrelated and interconnected silicon halide and zinc vaporizing and preheating systems has been found to operate satisfactorily close to atmospheric pressure, although higher or lower pressures may be used if desired.

The reduction reaction can be carried out using up to fifty percent excess or deficiency by weight of silicon tetrachloride over zinc, based on the equation:

$$2Zn + SiCl_4 = 2ZnCl_4 + Si$$

Preferably, however, from about five to ten percent is used. In order to further insure a hyperpure product, the flow of silicon tetrachloride is maintained through the reaction zone for a short period of time after the flow of zinc vapor through the reaction zone has been discontinued, at the end of the continuous reaction period.

The process of the invention, though particularly useful with silicon tetrachloride, is generally applicable to silicon halides, including for example such compounds as silicon tetrachloride, disilicon hexachloride, silicon tetrabromide, silicon tetrafluoride, and the like.

If desired, an inert carrier gas, such as argon, hydrogen, nitrogen, or other gas selected from the Eighth group of the Periodic Table may be used to assist in conveying the silicon halide or vaporized zinc through the equipment and to control reaction conditions.

Among the advantages of this process, it is evident that the high temperature pyrolysis of the carbon- and silicon-containing contaminants of silicon halide followed by distillation separation provides a dependable method of obtaining silicon halides of extreme high purity. Furthermore, such pure silicon halide is not only useful for the production of exceptional quality transistor grade crystals of elemental silicon, but for other uses wherein high purity silicon halides are required, as for example the production of extremely high purity silica and other silicon compounds.

I claim as my invention:

1. An improved method of purifying silicon halide containing contaminating compounds, including carbon compounds, comprising passing a stream of said silicon halide in the vapor state through a high temperature pyrolysis reaction zone at temperatures above 600° C., condensing the vapor emerging therefrom, separating the silicon halide from the pyrosynthesized compounds by distillation, and recovering the hyperpure silicon halide.

2. An improved method of purifying silicon tetrachloride containing contaminating compounds, including carbon compounds in minor amounts, comprising passing a stream of silicon tetrachloride vapor through a bed of fused silica particles maintained at a temperature within the range of about 975–1200° C., condensing the vapor emerging therefrom, separating the silicon tetrachloride from the pyrosynthesized contaminants by distillation, and recovering the hyperpure silicon tetrachloride.

References Cited in the file of this patent

UNITED STATES PATENTS

| 1,241,796 | Weaver | Oct. 2, 1917 |
| 2,594,370 | Warburton | Apr. 29, 1952 |

FOREIGN PATENTS

| 627,904 | Great Britain | Aug. 18, 1949 |
| 656,098 | Great Britain | Aug. 15, 1951 |

OTHER REFERENCES

Lyon et al.: "J. of Electrochemical Society," vol. 96, No. 6, December 1949, pages 359, 363.